United States Patent
Kelly et al.

(10) Patent No.: US 8,442,291 B2
(45) Date of Patent: May 14, 2013

(54) METHOD AND APPARATUS FOR ESTABLISHING A POSITION OF A PHANTOM IN AN IMAGE QUALITY TEST

(75) Inventors: Matthew David Kelly, Botley (GB); Thomas George Wright, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 710 days.

(21) Appl. No.: 12/625,660

(22) Filed: Nov. 25, 2009

(65) Prior Publication Data

US 2010/0135563 A1    Jun. 3, 2010

(30) Foreign Application Priority Data

Nov. 26, 2008 (GB) .................................. 0821561.8

(51) Int. Cl.
*G06K 9/00* (2006.01)
*G01T 1/164* (2006.01)

(52) U.S. Cl.
USPC ................... 382/131; 250/252.1; 250/363.03

(58) Field of Classification Search ............... 250/363.02–363.04; 378/16, 207; 382/131
See application file for complete search history.

(56) References Cited

U.S. PATENT DOCUMENTS

| 5,034,969 | A | 7/1991 | Ozaki |
| 5,214,578 | A * | 5/1993 | Cornuejols et al. ........... 378/207 |
| 6,409,383 | B1 | 6/2002 | Wang et al. |
| 6,493,574 | B1 * | 12/2002 | Ehnholm et al. .............. 600/429 |
| 6,694,047 | B1 | 2/2004 | Farrokhnia et al. |
| 7,289,654 | B2 | 10/2007 | Muller et al. |
| 2002/0110268 | A1 * | 8/2002 | Brinker et al. ................ 382/131 |
| 2002/0181660 | A1 | 12/2002 | Reinstein et al. |
| 2003/0213317 | A1 * | 11/2003 | Jaszczak et al. ............. 73/866.4 |
| 2004/0030246 | A1 * | 2/2004 | Townsend et al. ............ 600/427 |
| 2005/0094771 | A1 * | 5/2005 | Basu et al. .................... 378/207 |
| 2005/0117708 | A1 * | 6/2005 | Cho et al. ...................... 378/164 |
| 2007/0122020 | A1 * | 5/2007 | Claus et al. ................... 382/131 |
| 2009/0067583 | A1 * | 3/2009 | Vogt et al. .................... 378/207 |

* cited by examiner

*Primary Examiner* — Alexander H Taningco (74) *Attorney, Agent, or Firm* — Schiff Hardin LLP (57) ABSTRACT

In a method and apparatus for establishing the position of one or more constituent elements of a phantom in an image quality test for a medical imaging apparatus, an image of the phantom is obtained, and a landmark pixel or region of the image determined. Values of a given variable at pixels or regions at a predetermined distance from the landmark pixel or region are determined. The landmark pixel or region and the values of the variable are then used to establish the position of one or more of the constituent elements of the phantom.

13 Claims, 7 Drawing Sheets

$r_{bf} = \min(4.0mm, r_{ROI}/2)$

METHOD AND APPARATUS FOR ESTABLISHING A POSITION OF A PHANTOM IN AN IMAGE QUALITY TEST

BACKGROUND OF THE INVENTION

1. Field of the Invention

This invention is directed to a method and apparatus for establishing the position of one or more constituent elements of a phantom in an image quality test, such as the NEMA image quality test.

2. Description of the Prior Art

In the medical imaging field, several nuclear medicine emission imaging schemes are known. For example PET (Positron Emission Tomography) is a method for imaging a subject in 3D using an ingested radio-active substance which is processed in the body, typically resulting in an image indicating one or more biological functions. FDG, for instance, is a glucose analogue which is used as the radiopharmaceutical tracer in PET imaging to show a map of glucose metabolism.

To assess how accurately a medical imaging apparatus, such as a Positron Emission Tomography (PET) scanner, is performing, a series of tests are performed. These tests will be run when a new scanner is installed, and may be repeated at regular intervals to ensure that the performance of the scanner is still optimal.

To check medical imaging scanners, tests using scans on standard control objects are typically performed. One set of tests on PET scanners that are run are known as the NEMA Part 7 Image Quality tests (NEMA Standards Publication NU 2-2007 (2007) Performance Measurements of Positron Emission Tomographs, which are used to determine how well the scanner resolves small hot and cold lesions, and how well the scatter correction software algorithm is performing.

As described in the aforementioned NEMA Standards Publication, when running these tests, several compartments in an image phantom are filled with liquid containing different concentrations of 18F solution. The relevant statistics are computed by placing regions of interest (ROIs) on the image of the phantom as specified in the NEMA Standards Publication. To date, all known systems for analysing the results require at least some manual steps for the positioning of the ROIs.

Specific systems for aiding performance of tests such as the NEMA IQ test have been previously considered. As an alternative to these specific applications, some end-user sites may use their own custom MATLAB/IDL scripts.

The common feature of all of previously considered systems is that a level of manual intervention is required from the user. For instance, one of the previous applications will optimise the 3D position of each of the hot/cold sphere ROIs in a NEMA test based on an initial seed pixel selected by the user (one click for each ROI). The background and lung insert ROIs are then placed automatically and the appropriate statistics calculated.

Another previous application, requires even more manual input, with every hot/cold sphere ROI and every background ROI requiring explicit placement by the user.

Another requires extensive manual intervention. Specifically, manual selection of the axial slice to be used for analysis, along with manual placement of all 6 hot/cold sphere ROIs, 12 background ROIs and 1 lung insert ROI.

SUMMARY OF THE INVENTION

The present invention aims to address these problems and provide improvements upon the known devices and methods.

In general terms, in an embodiment of a first aspect of the invention, a method of establishing a position of one or more constituent elements of a phantom in an image quality test for a medical imaging apparatus includes the steps of: obtaining an image of the phantom; determining a landmark pixel or region of the image; obtaining values of a given variable at pixels or regions at a predetermined distance from the landmark pixel or region; and using the landmark pixel or region and the values of the variable to establish the position of one or more constituent elements of the phantom.

This allows a fully automatic method for finding the position of the phantom as a whole, or of constituent parts of the phantom, requiring no user-intervention.

Preferably, the step of obtaining values comprises obtaining a value of the given variable at each of a number of pixels or regions at a predetermined radius from the landmark pixel or region.

Suitably, the step of determining the landmark pixel or region comprises determining a pixel or region having a minimum value for the given variable.

More preferably, the test is a NEMA image quality test.

In another embodiment, after obtaining the values of the variable at the radius, a sequence of the values around a circumference defined by the radius, is obtained, and the sequence is compared to an expected sequence for the values around the circumference.

Preferably, the step of comparing proceeds by matching the sequence of values with a sequence of values representing a layout of hot and cold spheres of the phantom.

In another embodiment, the step of obtaining the image includes obtaining image data of an image volume, and obtaining as the image for processing an image section from the image volume containing the maximum value voxel for the given variable. Suitably, the image section is a two-dimensional image slice.

In another embodiment, an outer boundary for the phantom is determined using a predefined measurement from a previously identified constituent element of the phantom.

Determining the outer boundary of the phantom allows the automatic placement of the background spheres of the phantom, in addition to the central hot and cold spheres.

The method can further include the steps of plotting an inner boundary line at a predetermined distance inside the outer boundary, and, for a pixel on the inner boundary line, determining whether a background sphere placed at that location would be within a predetermined distance of another constituent element of the phantom.

In an embodiment of another aspect of the present invention, a method of establishing a position of one or more constituent elements of a phantom in an image quality test for a medical imaging apparatus includes the steps of obtaining an image of the phantom captured using the medical imaging apparatus, determining, in a processor, a landmark pixel or region of the image, obtaining, in the processor, values of a given variable at pixels or regions at a predetermined distance from the landmark pixel or region, and using the landmark pixel or region and the values of the variable to establish, in the processor, the position of one or more constituent elements of the phantom.

In an embodiment of a further aspect of the present invention, an apparatus for establishing a position of one or more constituent elements of a phantom in an image quality test for a medical imaging apparatus includes a processor configured to operate the medical imaging apparatus to obtain an image of the phantom, and to determine a landmark pixel or region of the image; obtain values of a given variable at pixels or regions at a predetermined distance from the landmark pixel or region; and, using the landmark pixel or region and the values of the variable, to establish the position of one or more constituent elements of the phantom.

The present invention also encompasses a computer-readable medium encoded with programming instructions that, when the medium is loaded into a processor, cause the processor to execute any and all of the different aspects of the invention described above, including all embodiments thereof.

DESCRIPTION OF THE PREFERRED EMBODIMENTS

The following describes an embodiment of the invention, an algorithm developed for the automated analysis of the NEMA image quality phantom according to the NEMA Standard cited above. The algorithm takes an image volume acquired as specified in the Standard, along with the activity concentration injected into the hot spheres and background in the imaged phantom. The algorithm returns the statistics calculated as described in the Standard. An evaluation of both the accuracy and robustness of the algorithm has demonstrated its suitability to the task.

When the following terms are used herein, the accompanying definitions can be applied:
PET—Positron Emission Tomography
ROI—Region of Interest
VOI—Volume (Region) of Interest
2D—Two dimensional
IQ—Image Quality
NEMA—National Electrical Manufacturers Association The NEMA Image Quality, Accuracy of Attenuation, and Scatter Corrections Test Application (henceforth referred to as the NEMA IQ Application), is aimed at facilitating the performance of the NEMA Image Quality, Accuracy of Attenuation, and Scatter Corrections Test.

A key component of this application is the automated placement of regions of interest (ROIs) at appropriate positions within the acquired phantom image. These ROIs are necessary for computing the recovery coefficients for the image.

The algorithm described in this embodiment identifies the optimal positions for each of the required ROIs and computes the recovery statistics as specified in the Section 7 of the NEMA Standards Publication NU 2-2007. The algorithm requires no user input.

This section will provide a high-level overview of the algorithm followed by a more detailed description of the individual components.

The main workflow of the algorithm is as follows:
1. Identify valid slice
2. Supersample slice
3. Position lung insert ROI
4. Position hot/cold sphere ROIs
5. Repeat steps 2-4 on set of neighbouring slices and select optimal slice
6. Position background ROIs
7. Calculate statistics The algorithm requires four inputs to be provided by the user:
1. Image Volume
   The 3D array of voxels.
2. Voxel dimensions
   The length of an image voxel along each of the 3 axes (in millimetres).
3. Activity concentration of hot spheres
   The activity injected into the four hot foreground spheres (kBq/cc).
4. Activity concentration of background
   The activity injected into the background of the phantom (kBq/cc).

In addition, there are a further four tuneable parameters:
1. Supersample factor
   The degree of supersampling to be performed on each of the five slices used in calculating statistics.
   A factor of 2 would double the number of voxels along each axis, while a factor of 3 would triple, etc.
   The NEMA standard requires a supersample factor that results in voxel dimensions in the axial plane of less than or equal to 1 mm by 1 mm.
2. Background ROI buffer
   The minimum distance allowable from the edge of a background ROI to the internal edge of the phantom and the edges of the hot/cold sphere ROIs (mm).
   The NEMA standard specifies 15 mm.
3. Phantom wall thickness
   The thickness of the external wall of the phantom (mm).
   The NEMA standard specifies 3 mm.
4. Range for optimal slice search
   The distance (mm) either side of the central axial slice that the algorithm will search over in order to identify the optimal slice.
   30 mm is the default value.

5. Template profile

A template intensity profile is used to identify the orientation of the hot/cold sphere ROIs within the image. The template profile is taken from an existing scan for with the sphere positions have been manually correlated with the intensity peaks and troughs in the profile.

The values of these parameters should not be adjustable by the user, but tuned in advance in order to meet the statistical and speed requirements for the application.

First, the optimal slice is defined as the axial slice providing the greatest recovery coefficient for the smallest hot sphere (which is 10 mm diameter). This is identified in two stages. The first stage provides a 'best guess' for this optimal slice by selecting the slice with the highest maximum voxel intensity from the set of slices neighbouring the central slice (since the standard specifies that "The body phantom shall be positioned axially in the scanner so that the center of the spheres is at the middle slice of the scanner" and "the plane through the centers of the spheres is coplanar to the middle slice of the scanner to within 3 mm throughout the extent of the phantom"). The size of the set of neighbours is one of the tuneable parameters described above. For all results described in this embodiment, a value of 30 mm was used, meaning all slices whose centre lies within 30 mm (along the z axis) of the centre of the central slice are included. In this embodiment, all slices are not evaluated because reconstruction artefacts can cause very high intensities in the end slices (FIG. 5), which may result in an incorrect slice being identified as the central slice.

Figure 1:
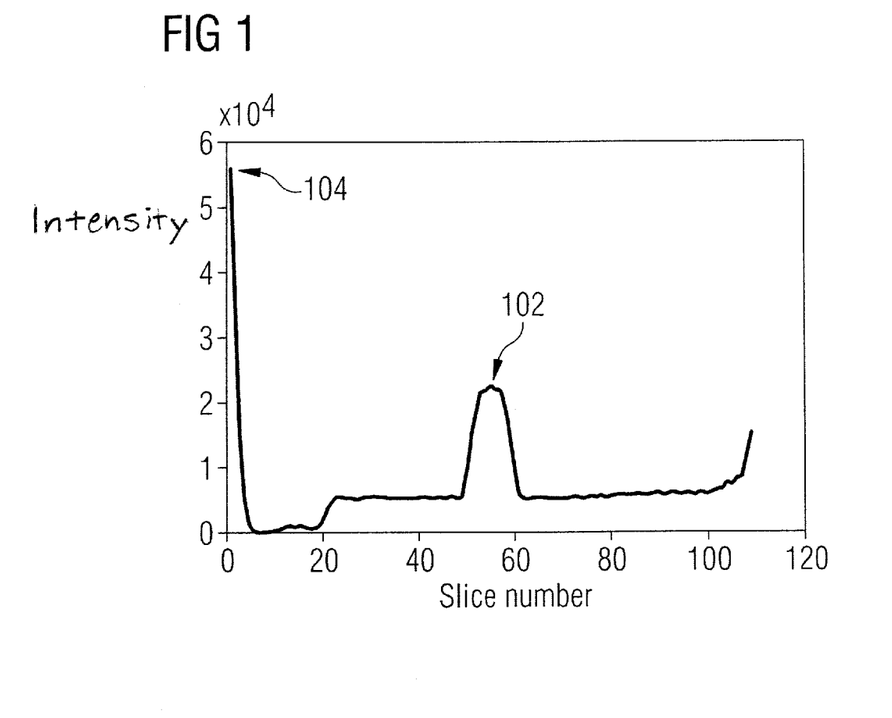
FIG. 1 is an example of a graph indicating maximum voxel intensity for each axial slice according to an embodiment of the invention.

FIG. 1 is an example of a graph indicating maximum voxel intensity for each axial slice. There is a clear peak (102) around the central slice corresponding to the location of the hot spheres; however, reconstruction artefacts may also cause high maximum intensities on the end slices (104).

Once this valid (or best guess) slice has been identified, the algorithm then performs the steps necessary to position the lung insert and hot/cold sphere ROIs to enable identification of the optimal slice through a comparison of this slice with a set of neighbouring slices.

Supersampling the slice: the standard specifies that "the ROI analysis tool should take into account partial pixels and also permit movement of the ROI in increments of 1 mm or smaller". The approach we have taken to meet this specification is to supersample the slice to produce a new pixel size of less than or equal to 1 mm. This allows us to both "account for partial pixels" through the subdivision of pixels and "permit movement of the ROI in increments of 1 mm or smaller" when ROIs are drawn at the supersampled image resolution.

Figure 2:
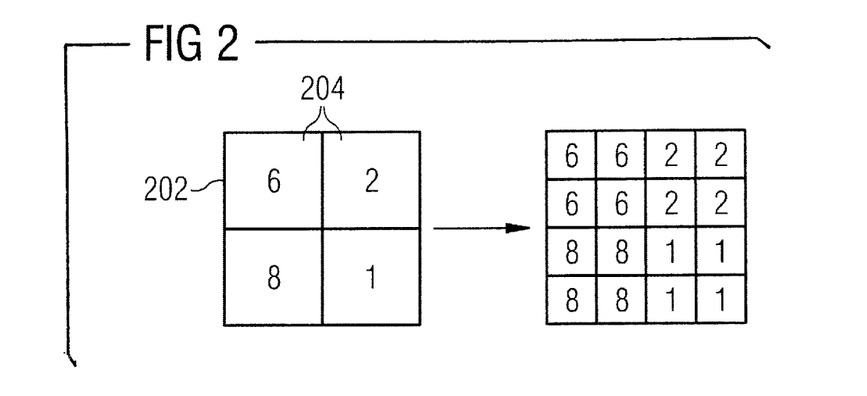
FIG. 2 is an illustration of a supersampling and interpolation method used in the algorithm according to an embodiment of the invention.

The supersampling method used by this algorithm is illustrated in FIG. 2.

FIG. 2 is an illustration of a supersampling and interpolation method used in the algorithm. For supersampling, each pixel is subdivided into a larger number of smaller pixels. In this illustration, each pixel (202) is subdivided into four smaller pixels (204) i.e., supersample factor of 2. The interpolation method is nearest neighbour, where each supersampled pixel takes the value of the original pixel (whose centre lies closest to its own centre).

Since in this embodiment all ROIs are drawn in 2D, we only need to supersample the individual axial slices we are working with, and only in the axial plane (i.e., we do not in this embodiment need to supersample the entire volume in 3D).

Each pixel is subdivided into a number of smaller pixels, with the number of smaller pixels determined by the supersample factor. For instance, a supersample factor of 2 would subdivide each pixel into four by dividing each dimension of the pixel (e.g., height and width) by 2. Likewise, a supersample factor of 3 would subdivide each voxel into nine.

The interpolation method used is nearest neighbour. Here, each supersampled pixel takes the value of the original pixel (since it is that pixel whose centre lies closest to that of the new supersampled pixel).

Optimizing ROI Position: each of the circular ROIs are positioned following the same routine. This routine starts from a rough guess at a starting point and comprises two stages: a 2D local optimisation, followed by a brute force search in the neighbourhood of this local minima.

2D Optimization: the initial estimate for the position of the optimal pixel is refined, as necessary, by maximising (for the 'hot' spheres), or minimising (for the 'cold' spheres and lung insert), the total value of pixels within the circular ROI centred on this pixel. All supersampled pixels with a Euclidean distance from their centre to the centre of the central pixel of less than or equal to the radius of the ROI are included in the ROI (FIG. 3).

Figure 3:
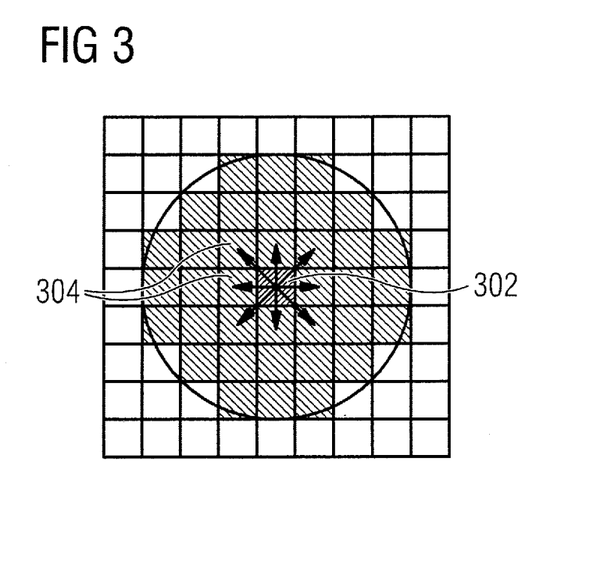
FIG. 3 is an illustration of the 2D optimisation routine according to an embodiment of the invention.

FIG. 3 is an illustration of the 2D optimisation routine. The sum of all pixels with a Euclidian distance from their centre to the centre of the central pixel (dark grey, 302) of less than or equal to the radius of the ROI, is calculated. This sum is also computed for each of the eight neighbouring pixels (304, indicated by the arrows), and the position producing the highest value (or lowest value for the lung insert and cold spheres) selected.

Since the function being minimised generally represents a simple surface with a single minimum (FIG. 4), the 2D optimization routine simply calculates the total value of pixels within the ROI centred on each of the eight neighbouring pixel positions and moves the centre of the ROI to the pixel producing the highest (or lowest) total ROI value (FIG. 3). This process is repeated until no further improvements can be made.

Figure 4:
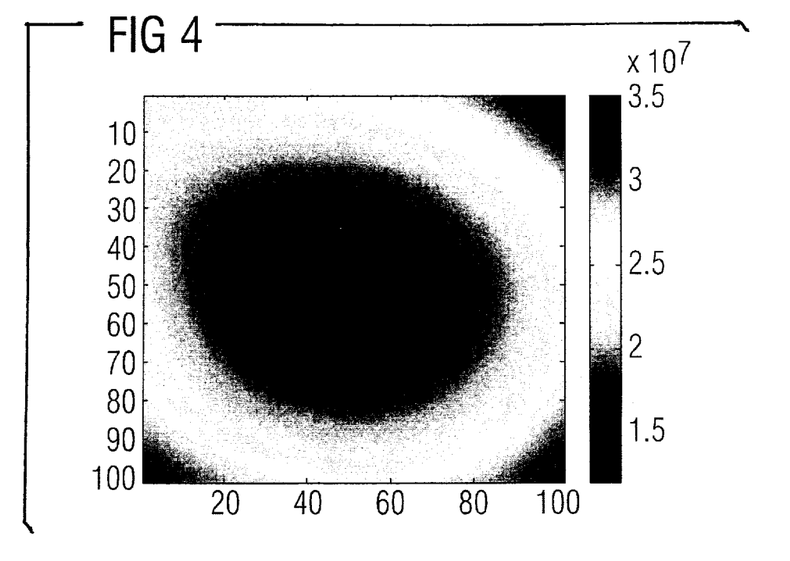
FIG. 4 illustrates results from the objective function for 2D optimisation of the lung insert according to an embodiment of the invention.

FIG. 4 illustrates results from the objective function for 2D optimisation of the lung insert. In the majority of cases studied, there was a single minimum, which was successfully identified by the optimisation routine.

Figure 5:
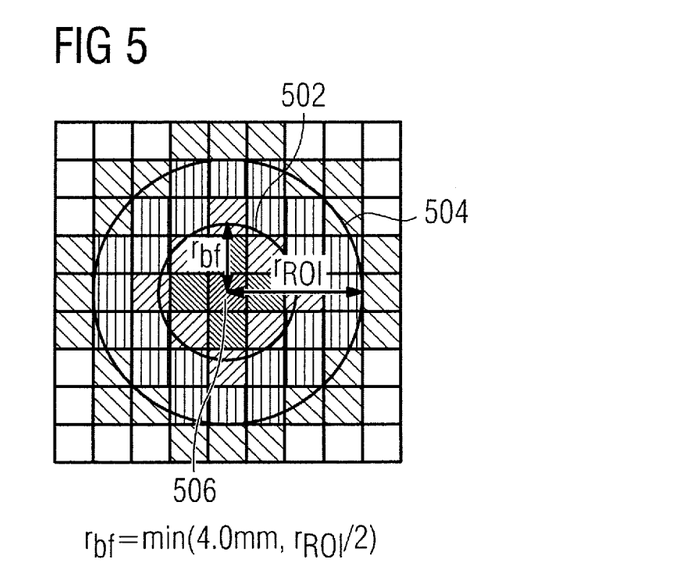
FIG. 5 illustrates the size search space for the brute-force optimisation according to an embodiment of the invention.

Brute-Force Search: although the function being minimized generally has a single minimum (FIG. 4), locatable by the 2D local optimization algorithm, a small number of examples did produce functions with more than one local minima (although these minima were close to one another spatially). In these cases, the 2D optimization could become trapped in a minima not corresponding to the global minima. To address this issue, a brute-force optimisation is performed to evaluate all central pixels within a circular search space, of radius equal to the smaller of 4.0 mm or half the radius of the ROI being minimized, centred on the pixel identified by the 2D optimization (FIG. 5). The central pixel producing the largest (for 'hot' spheres), or smallest (for 'cold' spheres and lung insert), sum of pixel intensities was selected as the optimal pixel for the ROI center.

FIG. 5 illustrates the size search space for the brute-force optimization (circle 502) defined by the minimum of either 4 mm or half the radius of the ROI being optimized (circle 504), and centred on the pixel identified by the 2D optimization (506).

Positioning Lung Insert ROI: once the optimal slice has been supersampled, the next step is to identify and position the circular ROI for the lung insert. Given the NEMA standard states the phantom should be "positioned transaxially so that the center of the phantom is centered in the scanner", the central pixel in the optimal slice is taken as the starting point for the ROI optimisation routine. The optimization routine will identify the closest 'cold' ROI to the starting point and therefore will handle some degree of misalignment of the phantom.

Although the NEMA standard indicates a 30 mm diameter ROI should be placed in the lung insert for the Accuracy of Attenuation and Scatter Corrections calculations, a 50 mm diameter ROI (corresponding to the physical size of the lung insert) is used for optimising the position of the ROI. The center of this larger ROI is then used to draw the 30 mm ROI.

Figure 6:
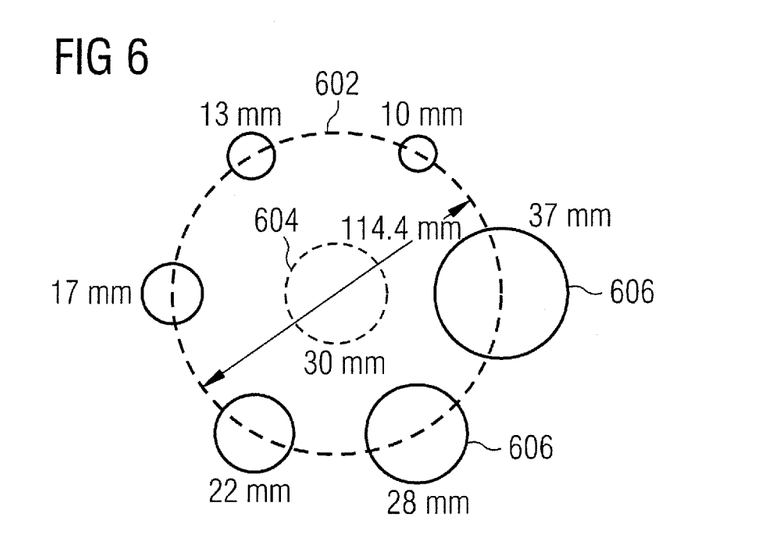
FIG. 6 is an illustration of hot/cold sphere arrangement within the phantom according to an embodiment of the invention.

Positioning Hot/Cold Sphere ROIs: the NEMA standard specifies that "the transverse positioning of the spheres shall be so that the centers of the spheres are positioned at a radius of 5.72 cm from the center of the phantom" (FIG. 6). The sphere centres are equally spaced around this circumference in either an ascending or descending order of size. Whilst the standard specifies that "the 17 mm diameter sphere shall be positioned along the horizontal axis of the phantom", the precise orientation of the spheres often varies between studies.

FIG. 6 is an illustration of hot/cold sphere arrangement within the phantom. The centre of each sphere lies on the circumference of a circle of diameter 114.4 mm (dashed circle 602) centred on the lung insert (dotted circle 604). The sphere centers (606) are equally spaced around this circumference.

The routine for positioning the ROIs corresponding to the hot/cold spheres takes the pixel corresponding to the center of the lung insert ROI as its starting point. A profile of the pixel intensities on the circumference of the circle passing through the centre of the hot/cold spheres (dashed line in FIG. 6), is then plotted (FIG. 7). The pixels comprising this profile are calculated by identifying the pixel closest to the point 57.2 mm from the centre of the central pixel in the lung insert ROI at 0.5 degree intervals around the circle. This produces a set of 720 intensities. This set of intensities is then duplicated then appended to provide a total set of 1440 intensities (FIG. 7(b)).

The next step is to identify the precise alignment of the hot/cold spheres by identifying the best alignment of a template profile with the measured profile (the repetition of the measured profile facilitates the alignment). The template profile is simply the set of 720 pixel intensities previously calculated (as above) for one of our datasets (OSEM reconstructed). For the comparison, both the template and the image profile are normalised to values between zero and one, and smoothed using a Gaussian filter with a sigma of 3 pixels. The best alignment between the template profile and the measured profile is identified by brute force; i.e., the sum of squared error for every possible alignment between the two profiles is calculated (with the template profile in both in both forward and reverse order) and the best alignment selected (FIG. 8).

Figure 7A:
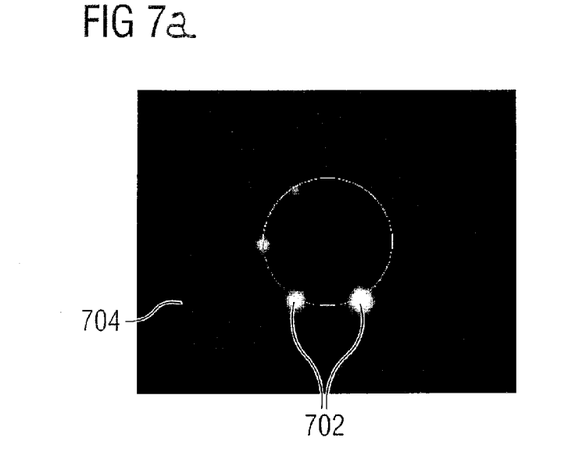
FIG. 7(a) is an illustration of the circumference of a circle passing through the centre of the hot/cold spheres.
Figure 7B:
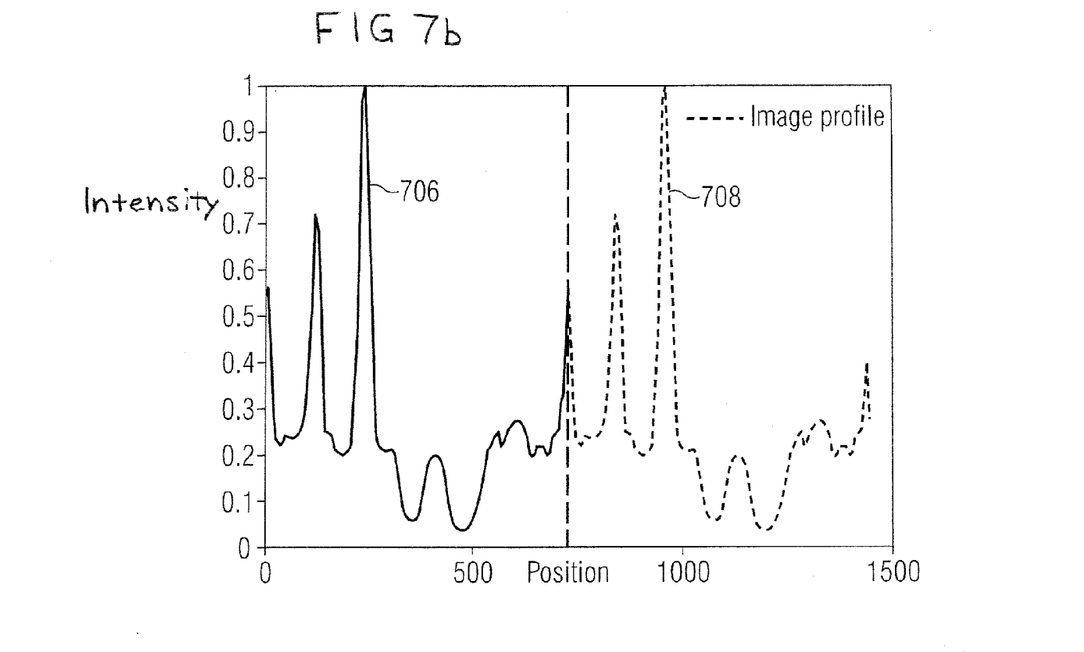
FIG. 7(b) is a plot of the intensities of these pixels, according to embodiments of the invention.

FIG. 7 (a) highlights in white (702) the pixels on the circumference of the circle (704) passing through the center of the hot/cold spheres. FIG. 7(b) is a plot of the intensities of these pixels. The plot in fact contains two copies (706, 708) of these intensities to effectively represents two revolutions around the circle (to aid alignment of the template profile).

Figure 8:
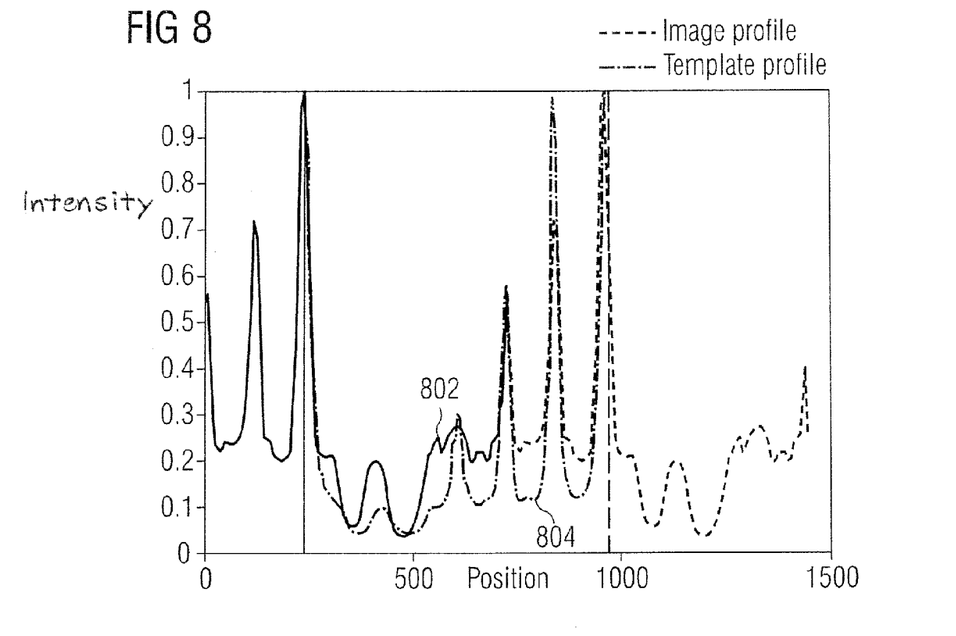
FIG. 8 illustrates the best calculated alignment of the template profile and the measured image profile according to an embodiment of the invention.

FIG. 8 illustrates the best calculated alignment of the template profile (802) and the measured image profile (804). The pixel position in the template profile corresponding to the center of each of the hot/cold spheres from the image used to generate the template profile is known (i.e., corresponding peak or trough), and is then used to provide an initial estimate of the central pixel corresponding to each of the hot/cold spheres in the current image.

For the template profile, each hot/cold sphere ROI corresponds to a specific position in the intensity. Once the best alignment between the template profile and the measured image profile has been identified, the corresponding position for the hot/cold spheres in the measured image profile can be identified to provide a bearing from the central pixel in the lung insert ROI to each of the hot/cold sphere ROIs. Since the radius is already know, the pixel most closely corresponding to the bearing and radius for each hot/cold sphere ROI can be readily identified.

The precise ROI positions for each of the hot/cold spheres are then optimised following the routine described above, with the optimization seeking to maximize the total pixel intensity within the ROI for the four 'hot' spheres, and minimize it for the two 'cold' spheres.

Select optimal slice: following positioning of the hot/cold sphere ROIs, the sum of pixel intensities in the smallest (10 mm diameter) ROI is calculated. The greater this value, the better the recovery coefficient will be. The steps described in above are then repeated for each of a set of neighboring slices and the sum of intensities for the smallest ROI calculated for each (since this ROI will be most sensitive the changes in slice). The number of neighboring slices compared is calculated as the number required to span the diameter of the smallest sphere (following on from the assumption that the best guess slice at least bisects the smallest sphere). The slice providing the highest sum is then selected as the optimal slice, to be used for positioning of the background ROIs and calculation of the necessary image quality statistics.

Positioning background ROIs: once the optimal slice and position of the foreground ROIs are known, the next step is to position the twelve background ROIs on the optimal slice. This process can be broken up into two tasks: Identifying the outer phantom boundary, and positioning the background ROIs.

Identifying outer phantom boundary: an ROI corresponding to the outer boundary of the phantom is created, taking the centre of the lung insert ROI for initial alignment (this routine assumes the phantom is oriented correctly in the scanner; i.e., resting on its base). The ROI is drawn analytically based on the geometric construction of the phantom (see FIG. 9); specifically, the outline of the portions of the three circles and straight line that form the outer edge of the phantom. The sum of all pixels that lie within this boundary (i.e., inside the phantom) is then calculated and, in a routine analogous to that used for 2D optimization of circular ROIs, is maximised by moving the central pixel from which the outline is drawn in single increments (evaluating each of the eight neighboring voxels at each iteration and selecting the maximum). The purpose of this optimization is to account for any small deviations in the geometry of the phantom relative to the centre of the hot/cold sphere (e.g., due to warping of the phantom). This can be necessary to ensure accurate positioning of the background spheres.

The central pixel producing the optimal positioning of the phantom boundary is then used in the algorithm for positioning the background ROIs.

Figure 9:
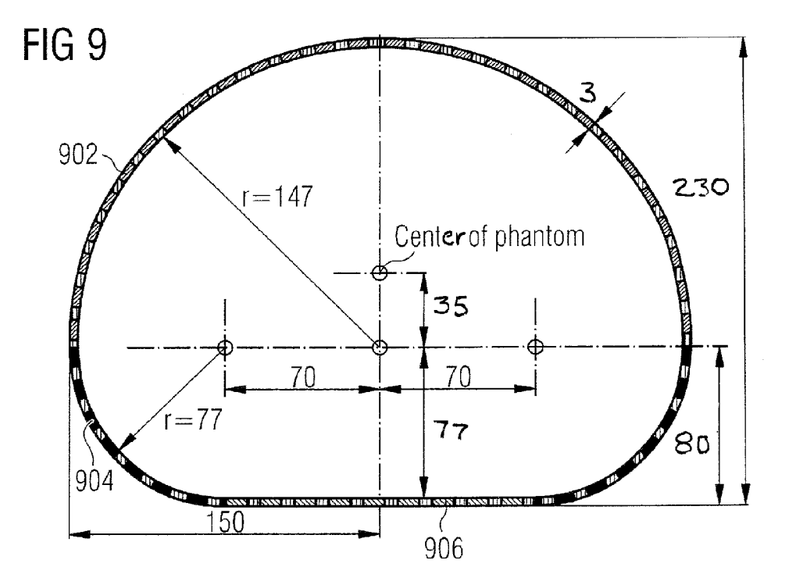
FIG. 9 is a diagram of the specification of the NEMA IQ phantom.

FIG. 9 is a diagram of the specification of the NEMA IQ phantom (taken from the NEMA Standard). The transaxial phantom outline is constructed from a semicircle of radius 150 mm (top section, 902), two quarter-circles or radius 80 mm (bottom corners, 904) and a straight line of length 140 mm (906) connecting the two quarter circles.

Figure 10:
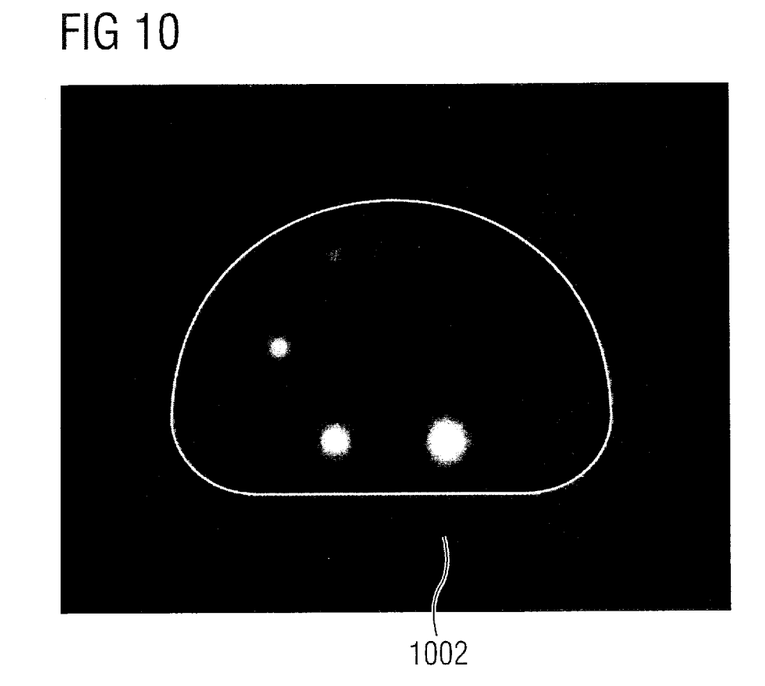
FIG. 10 is an illustration of the path on which the centres of the background ROIs are attempted to be placed according to an embodiment of the invention.

Positioning background ROIs: starting from the central pixel identified as above, the path of a second, inner outline is now created; however, this outline corresponds to line on which the centre of the background spheres should lie in order to conform to the standard (i.e., "Twelve 37 mm diameter ROIs shall be drawn throughout the background at a distance of 15 mm from the edge of the phantom but no closer than 15 mm to any sphere.") (FIG. 10). For example, this outline should be 15 mm (background ROI buffer) plus 18.5 mm (radius of largest background sphere) inside the outer boundary of the phantom. An additional 3 mm, corresponding to the thickness of the outer phantom wall should be added.

Figure 11:
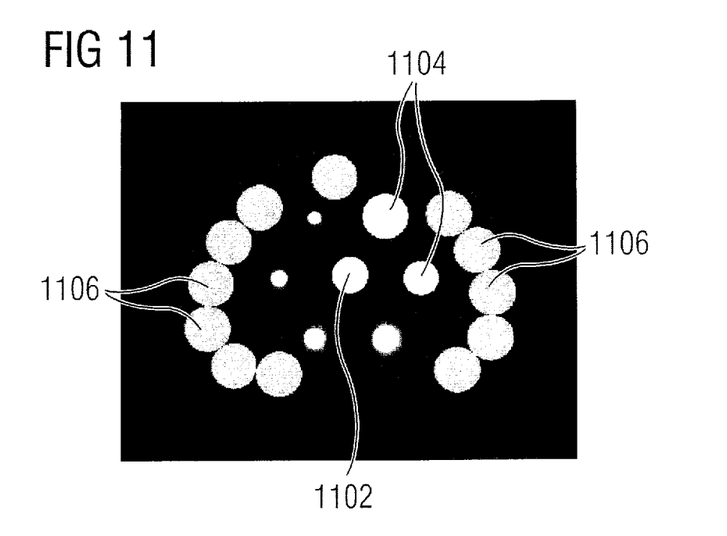
FIG. 11 illustrates the final positioning of the lung insert ROI, the six hot/cold sphere ROIs, and the twelve background ROIs according to an embodiment of the invention.

At each pixel that corresponds to this inner outline as it is virtually traced on the image, the algorithm attempts to place a background sphere. If this sphere position would violate either the constraint of being within 15 mm of a foreground sphere ROI (as positioned in Section 5.6), or overlap with an existing background sphere, it is rejected and the algorithm evaluates the next pixel; otherwise, a background sphere is positioned centered on this pixel. This process is repeated until either all twelve background spheres are placed, or all pixel positions on the inner outline have been evaluated (FIG. 11). If the algorithm has been unable to place all twelve background spheres, this is reported to the client.

FIG. 10 is an illustration of the path (1002) on which the centers of the background ROIs are attempted to be placed. FIG. 11 illustrates the final positioning of the lung insert ROI (centre, 1102), the six hot/cold sphere ROIs (1104), and the twelve background ROIs (1106).

Calculating statistics: once all ROIs have been positioned, the Recovery Coefficients and Accuracy of Attenuation and Scatter Corrections can be calculated. The formulas used in the calculations are described in Section 7.4 of the cited NEMA Standard. In order to calculate the necessary statistics, twelve background ROIs should also be positioned on the four axial slices most closely corresponding to plus and minus ten and twenty millimetres from the optimal slice. This is done by simply positioning the ROIs in exactly the same positions in the additional slices as calculated for the optimal slice (i.e., they do not need to be recalculated). Background ROIs of smaller sizes corresponding to the other hot/cold sphere ROIs should also be positioned concentric to the positioned 37 mm diameter background ROIs. For these smaller background ROIs, the centers calculated for the 37 mm diameter background ROIs are used (FIG. 12).

Background ROIs of 30 mm diameter are also required for the Accuracy of Attenuation and Scatter Corrections. These ROIs are also positioned on the centres calculated for the 37 mm diameter background ROIs. Finally, ROIs for the lung insert are also required on the four axial slices most closely corresponding to plus and minus ten and twenty millimeters from the optimal slice. These are positioned in exactly the same positions in the additional slices as calculated for the optimal slice (i.e., they do not need to be recalculated).

Figure 12:
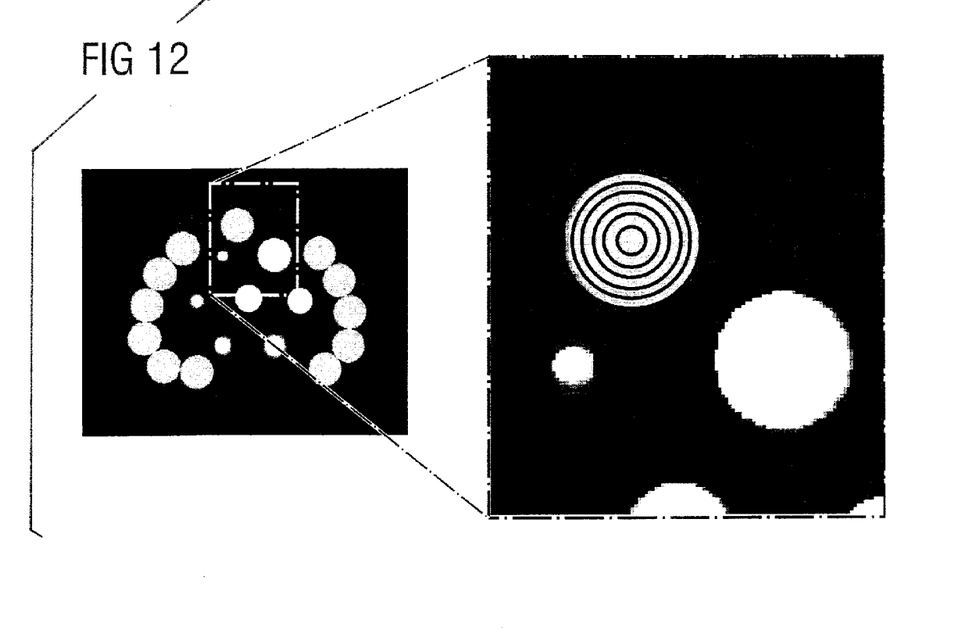
FIG. 12 is an illustration of the concentrically positioned background ROIs according to an embodiment of the invention.

FIG. 12 is an illustration of the concentrically positioned background ROIs, each used in the calculation of the statistics for the correspondingly-size hot/cold sphere ROI.

Those of ordinary skill in this field will appreciate that there are numerous ways in which each different part of the algorithm can be implemented, without departing from the scope of the invention—some are listed below:

When trying to find the optimal location of each circular ROI, any optimization algorithm can be used in place of the fairly simple approach we use. In experiments, the method has been shown to provide enough performance for most needs.

Rather than positioning circular ROIs in 2D to cover the hot and cold spheres of the phantom, one can fit spherical ROIs in 3D: The position of the centres of these spheres can be used to assess alignment of the phantom, any misalignment can then be corrected by reorientating and resampling the image volume as necessary. It should be noted, however, that 2D ROIs will likely still be needed for the statistical analysis since these are specified by the standard.

As opposed to using supersampling, with nearest-neighbor interpolation, the analyzed image slices to account for partial pixels and enable sub-millimeter movement of the ROIs, any alternative interpolation method (e.g., tri-linear interpolation) may be used, or alternatively a more analytic approach to accounting for partial pixels can be used.

Figure 13:
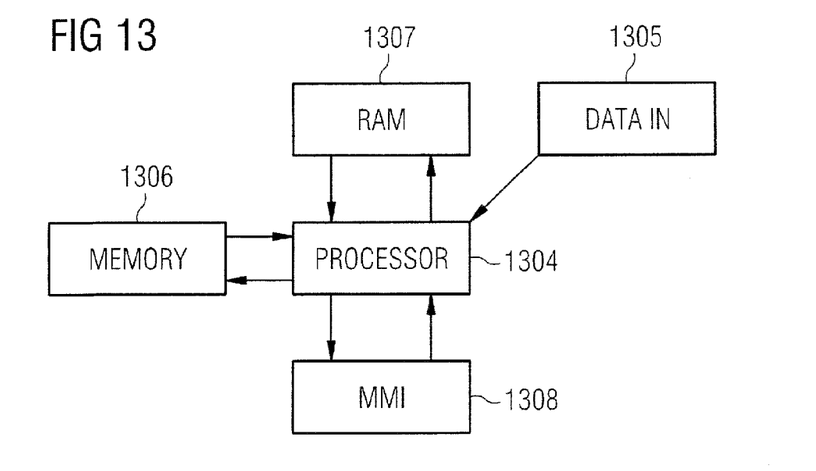
FIG. 13 is a diagram illustrating an apparatus according to an embodiment of the invention.

Referring to FIG. 13, the above embodiments of the invention may be conveniently realized as a computer system suitably programmed with instructions for carrying out the steps of the methods according to the invention.

For example, a central processing unit 1304 is able to receive data representative of medical scans via a port 1305 which could be a reader for portable data storage media (e.g. CD-ROM); a direct link with apparatus such as a medical scanner (not shown) or a connection to a network.

Software applications loaded on memory 1306 are executed to process the image data in random access memory 1307.

A Man-Machine interface 1308 typically includes a keyboard/mouse/screen combination (which allows user input such as initiation of applications) and a screen on which the results of executing the applications are displayed.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method of establishing a position of one or more constituent elements of a phantom in an image quality test for a medical imaging apparatus, comprising the steps of:
   operating the medical imaging apparatus to obtain an image of the phantom;
   providing said image to a processor and, in said processor, determining a landmark pixel or region of the image;
   in said processor, obtaining values of a given variable at each of a plurality of pixels or regions at a predetermined radius from the landmark pixel or region;
   after obtaining the values of the variable at the radius, obtaining, in said processor, a sequence of the values around a circumference defined by the radius;
   in said processor, comparing the sequence to an expected sequence for the values around the circumference; and
   in said processor, using the landmark pixel or region and the values of the given variable to establish the position of one or more constituent elements of the phantom, and making said position available as an electronic signal at an output of said processor.

2. A method according to claim 1, wherein the step of comparing comprises matching the sequence of values with a sequence of values representing a layout of hot and cold spheres of the phantom.

3. A method according to claim 1 wherein the step of determining the landmark pixel or region comprises determining a pixel or region having a minimum or maximum value for the given variable.

4. A method according to claim 1, comprising employing a NEMA image quality test.

5. A method according to claim 1 wherein the step of obtaining the image comprises:
   obtaining image data of an image volume; and
   obtaining as the image for processing an image section from the image volume containing the maximum or minimum value voxel for the given variable.

6. A method according to claim 5, comprising employing a two-dimensional image slice.

7. A method according to claim 1, further comprising:
determining an outer boundary for the phantom using a measurement from a constituent element of the phantom.

8. A method according to claim 7, further comprising:
plotting an inner boundary line at a predetermined distance inside the outer boundary; and
for a pixel on the inner boundary line, determining whether a background sphere placed at that location would be within a predetermined distance of another constituent element of the phantom.

9. A method as claimed in claim 1 wherein said medical imaging apparatus is a positron emission tomography (PET) apparatus, and wherein the step of operating the medical imaging apparatus to obtain an image of the phantom comprises operating said PET apparatus to obtain a PET image of the phantom.

10. Apparatus for establishing a position of one or more constituent elements of a phantom in an image quality test for a medical imaging apparatus, comprising:
a processor configured to operate a medical imaging apparatus to obtain an image of the phantom using the medical imaging apparatus, and to determine a landmark pixel or region of the image; obtain values of a given variable at each of a plurality of pixels or regions at a predetermined radius from the landmark pixel or region, and, after obtaining the values of the variable at the radius, to obtain a sequence of the values around a circumference defined by the radius, and to compare the sequence to an expected sequence for the values around the circumference, and to use the landmark pixel or region and the values of the given variable to establish the position of one or more constituent elements of the phantom and to make said position available as an electronic signal at an output of said processor.

11. An apparatus as claimed in claim 10 wherein said medical imaging apparatus is a positron emission tomography (PET) apparatus, and wherein said processor is configured to operate said PET apparatus to obtain a PET image of the phantom as said image of the phantom.

12. A non-transitory, computer-readable storage medium encoded with programming instructions for establishing a position of one or more constituent elements of a phantom in an image quality test or a medical imaging apparatus, said medium being loadable into a processor of the medical imaging apparatus and said programming instructions causing said processor to:
operate the medical imaging apparatus to obtain an image of the phantom;
determine a landmark pixel or region of the image;
obtain values of a given variable at each of a plurality of pixels or regions at a predetermined radius from the landmark pixel or region;
after obtaining the values of the variable at the radius, obtain a sequence of the values around a circumference defined by the radius;
compare the sequence to an expected sequence for the values around the circumference; and
use the landmark pixel or region and the values of the given variable to establish the position of one or more constituent elements of the phantom and make said position available as an electronic signal at an output of said processor.

13. A non-transitory, computer-readable data storage medium as claimed in claim 12 wherein said medical imaging apparatus is a positron emission tomography (PET) apparatus, and wherein said programming instructions cause said processor to operate said PET apparatus to obtain a PET image of the phantom, as said image of the phantom.

* * * * *